(12) United States Patent
Yin

(10) Patent No.: US 11,366,360 B2
(45) Date of Patent: Jun. 21, 2022

(54) DISPLAY PANEL AND MANUFACTURING METHOD THEREOF

(71) Applicant: WUHAN CHINA STAR OPTOELECTRONICS TECHNOLOGY CO., LTD., Hubei (CN)

(72) Inventor: Bingkun Yin, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 268 days.

(21) Appl. No.: 16/632,477

(22) PCT Filed: Nov. 5, 2019

(86) PCT No.: PCT/CN2019/115621
§ 371 (c)(1),
(2) Date: Jan. 20, 2020

(87) PCT Pub. No.: WO2021/027096
PCT Pub. Date: Feb. 18, 2021

(65) Prior Publication Data
US 2021/0405418 A1    Dec. 30, 2021

(30) Foreign Application Priority Data

Aug. 12, 2019   (CN) .......................... 201910737950.5

(51) Int. Cl.
*G02F 1/1339*  (2006.01)
*G02F 1/1368*  (2006.01)

(52) U.S. Cl.
CPC ...... *G02F 1/13396* (2021.01); *G02F 1/13394* (2013.01); *G02F 1/1368* (2013.01)

(58) Field of Classification Search
CPC ........... G02F 1/133305; G02F 1/13396; G02F 1/13394; G02F 1/13398
See application file for complete search history.

(56) References Cited

U.S. PATENT DOCUMENTS

| | | | | |
|---|---|---|---|---|
| 2015/0362767 A1* | 12/2015 | Zhao | ...................... | G02F 1/1339 349/153 |
| 2016/0109743 A1* | 4/2016 | Wu | ..................... | G02F 1/13394 349/42 |
| 2019/0324310 A1* | 10/2019 | Kudo | .................. | G02F 1/13338 |
| 2020/0348551 A1* | 11/2020 | Chen | ..................... | G02F 1/0107 |

FOREIGN PATENT DOCUMENTS

| | | |
|---|---|---|
| CN | 104111562 A | 10/2014 |
| CN | 104155809 A | 11/2014 |
| CN | 104298015 A | 1/2015 |
| CN | 104464538 A | 3/2015 |
| CN | 108172124 A | 6/2018 |

* cited by examiner

Primary Examiner — Angela K Davison

(57) ABSTRACT

A display panel and a manufacturing method for display panel are disclosed. The display panel including: a first substrate, a second substrate, first protrusions, and second protrusions. A gap is disposed between the adjacent first protrusions and the adjacent second protrusions, and the first protrusions and the second protrusions are inserted into the gap corresponding to each other to form a fastening interlock structure. The fastening interlock structure effectively releases a bending stress formed by the bending of the panel and protects the display panel.

13 Claims, 3 Drawing Sheets

DISPLAY PANEL AND MANUFACTURING METHOD THEREOF

FIELD DISCLOSURE

The present disclosure is related to the technical field of display, and in particular to a display panel and a manufacturing method thereof.

BACKGROUND OF DISCLOSURE

Liquid crystal displays (LCD) are widely used in a field of display devices, due to their advantages, such as thinness, power conservation, radiation-free, etc.

With the development of liquid crystal display technology and the diversified trend of display functions, curved displays are widely used. Compared with a flat panel display, the curved display not only has a wider angle of view, but also can reduce distortion when being watched at a close range and realize product differentiation. The curved display is formed by bending the liquid crystal display. In the prior art, when a curved liquid crystal cell is bent, an upper substrate of the display panel is stretched due to the bending, and, moreover, a lower substrate is squeezed when during the bending. After the bending is completed, the stretching and the squeezing eventually act on a sealant which bonds the two substrates together, and further form a shear stress. When the shear stress is greater than a strength of the sealant itself and a bonding strength between the sealant and the upper and lower substrates, the sealant itself is broken, or the sealant is torn from the upper substrate or the lower substrate, which reduces life of the display panel, and even affects normal use of the display panel in a severe situation. Therefore, it is unfavourable to designs of products with a high ratio of screen to body.

Therefore, it is necessary to propose a solution to the problems in the prior art.

SUMMARY OF INVENTION

Technical Problems

In summary, in a conventional curved display panel, when an upper substrate and a lower substrate are bent, shear stress remains inside the panel, and easily causes cracking of each component in the display panel, thereby reducing service life of the display panel.

Technical Solutions

In order to solve the problems stated above, the present disclosure provides a display panel and a manufacturing method thereof to solve the problem that bending stress remains inside the panel, and causes cracking of components in the display panel, and service life of the display panel is affected.

In order to solve the technical problem stated above, the present disclosure provides the technical solutions as below:

According to a first aspect of an embodiment of the present disclosure, a display panel is provided, including:
a first substrate;
a second substrate, wherein the first substrate is disposed opposite to the second substrate;
the first substrate and the second substrate further include a flat region and a bending region disposed adjacent to the flat region;
wherein the first substrate is provided with first protrusions and the second substrate is provided with second protrusions on an area corresponding to the bending region, a gap is disposed between adjacent ones of the first protrusions and adjacent ones of the second protrusions, the first protrusions and the second protrusions are inserted in an alternative manner into the gap;
wherein a length of the first protrusions and a length of the second protrusions are less than a distance between the first substrate and the second substrate, and the first substrate includes a thin film transistor substrate.

According to an embodiment of the present disclosure, a cross-sectional area of the second protrusions away from an end of the second substrate is smaller than a cross-sectional area of an end of the second protrusions connected to the second substrate.

According to an embodiment of the present disclosure, the display panel further includes a sealant, which is coated on the bending region, and seals the first protrusions and the second protrusions.

According to an embodiment of the present disclosure, an arrangement shape of the first protrusions includes a rectangular array, and an arrangement shape of the second protrusions includes a linear array, and the linear array is correspondingly inserted into spaces of the rectangular array.

According to an embodiment of the present disclosure, the arrangement shape of the first protrusions includes a triangular array, and the arrangement shape of the second protrusions includes a triangular arrangement.

According to an embodiment of the present disclosure, the second protrusions include a support pillar disposed in the flat region and the bending region.

According to an embodiment of the present disclosure, the second substrate includes a color filter substrate.

According to an embodiment of the present disclosure, the display panel further includes a black array layer and a color resist layer, the black array layer and the color resist layer disposed on a side of the second substrate opposite to the first substrate.

According to a second aspect of the present disclosure, a display panel is further provided, including:
a first substrate;
a second substrate, wherein the first substrate is disposed opposite to the second substrate;
the first substrate and the second substrate further include a flat region and a bending region disposed adjacent to the flat region;
wherein the first substrate is provided with first protrusions and the second substrate is provided with second protrusions on an area corresponding to the bending region, a gap is disposed between adjacent ones of the first protrusions and adjacent one of the second protrusions, and the first protrusions and the second protrusions are inserted in an alternative manner into the gap.

According to an embodiment of the present disclosure, a length of the first protrusions and a length of the second protrusions are less than a distance between the first substrate and the second substrate.

According to an embodiment of the present disclosure, a cross-sectional area of the second protrusions away from an end of the second substrates is smaller than a cross-sectional area of an end of the second protrusions connected to the second substrate.

According to an embodiment of the present disclosure, the display panel further includes a sealant, which is coated on the bending region, and seals the first protrusions and the second protrusions.

According to an embodiment of the present disclosure, an arrangement shape of the first protrusions includes a rectangular array, and an arrangement shape of the second protrusions includes a linear array, and the linear array is correspondingly inserted into spaces of the rectangular array.

According to an embodiment of the present disclosure, the arrangement shape of the first protrusions includes a triangular array, and the arrangement shape of the second protrusions includes a triangular arrangement.

According to an embodiment of the present disclosure, the second protrusions include a support pillar disposed in the flat region and the bending region.

According to an embodiment of the present disclosure, the first substrate includes a thin film transistor substrate, and the second substrate includes a color filter substrate.

According to an embodiment of the present disclosure, the display panel further includes a black array layer and a color resist layer, and the black array layer and the color resist layer disposed on a side of the second substrate opposite to the first substrate.

According to a third aspect of the present disclosure, a display panel is further provided, including steps as below:

Step S100 is related to providing a first substrate, and forming a film, exposing, developing, and etching process on the first substrate to form an array substrate;

Step S101 is related to providing first protrusions in a bending region of the first substrate;

Step S102 is related to providing a second substrate, and coating, exposing, and curing processes on the second substrate, providing second protrusions, and forming a color filter substrate;

Step S103 is related to engaging the first protrusions and the second protrusions and sealing the first protrusions and the second protrusions to form a display panel.

Beneficial Effects

In summary, the beneficial effects of the present disclosure are as follows:

The present disclosure provides a display panel and a manufacturing method thereof. The first protrusions and the second protrusions are disposed in the bending region of the curved display panel, and the first protrusions and the second protrusions are respectively inserted into the gaps between the protrusions when in a cell-forming process. Thereby, the two panels are engaged, and when the bending portion is bent, the engaged first protrusion and the second protrusion decrease a bending stress in the bending region and increase an adhesion between the substrates at the same time, so as to prevent the problem that the bending region of the panel is torn, and improve the life of the display panel.

DETAILED DESCRIPTION OF EMBODIMENTS

The following description of each embodiment refers to the drawings, in order to illustrate the specific embodiments that may be implemented by the present disclosure.

Figure 1:
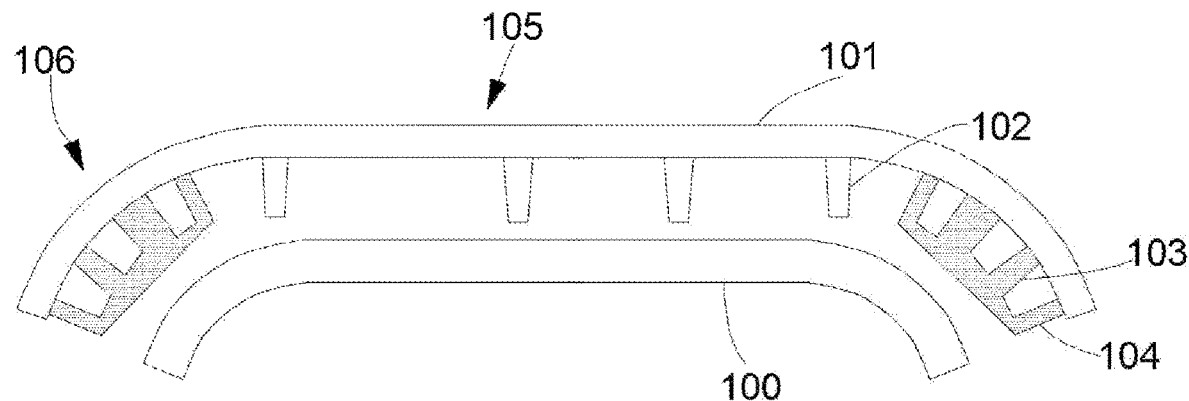
FIG. 1 is a schematic view of a structure of a display panel according to the prior art.

In an embodiment of the present disclosure, refer to FIG. 1, which is a schematic view of a structure of a display panel according to the prior art. The display panel includes a thin film transistor substrate 100 and a color filter substrate 101. The thin film transistor substrate 100 is disposed opposite to the color filter substrate 101, and the display panel further includes a first support pillar 102, a second support pillar 103, and a sealant 104. Wherein, the first support pillar 102 is disposed in a flat region 105 of the display panel, the first support pillar 102 can effectively maintain uniformity of the thickness of cell, and the second support pillar 103 is disposed in a bending region 106 of the display panel. The display panel is bent at the bending region 106 to form a curved display panel. After the bending, a sealant is filled at an edge of the bending region 106 of the display panel to fix the thin film transistor substrate 100 and the color filter substrate 101.

In the existing curved display panel, the bending region 106 is connected only by the sealant 104, and the bending force is strong at the bending region 106. After the bending, the upper substrate and the lower substrate in this region are under the effect of tensile stress and compressive stress. The long-term effect of tensile stress and compressive stress forms shear stress, which easily causes the display panel to be torn at the edge.

Figure 2:
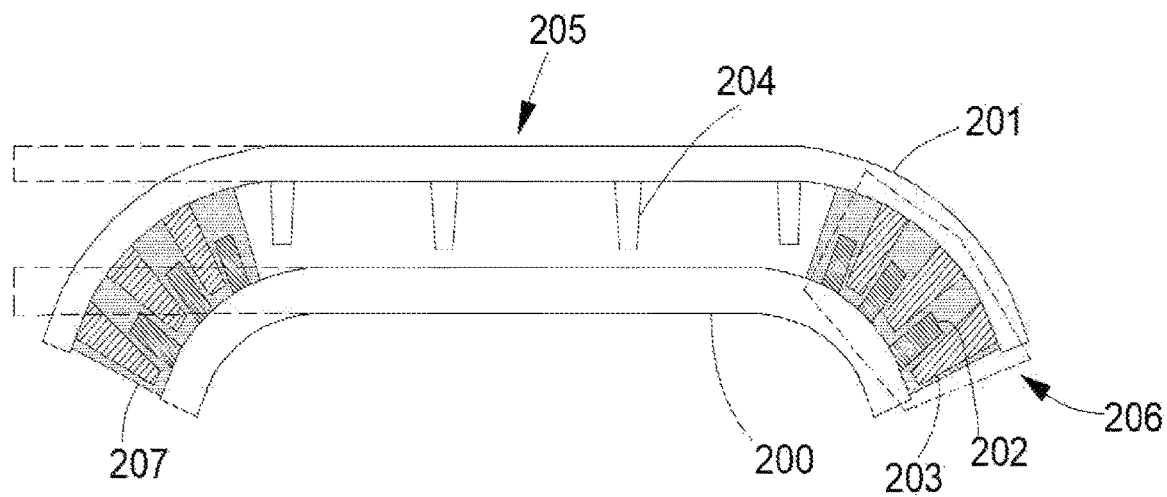
FIG. 2 is a schematic view of a structure of a curved display panel according to an embodiment of the present disclosure.

Refer to FIG. 2, which is a schematic view of a structure of a curved display panel according to an embodiment of the present disclosure. The curved display panel includes a first substrate 200, a second substrate 201, wherein the first substrate 200 is disposed opposite to the second substrate 201. The first substrate includes a thin film transistor substrate and the second substrate includes a color filter substrate. A polyimide film is further disposed on a surface of the first substrate 200 opposite to the second substrate 201, so as to facilitate disposing respective components and other films on the polyimide film.

Moreover, the curved display panel further includes first support pillars 202 and second support pillars 203. Spacer pillars 204 are further disposed on a side of the second substrate 201 opposite to the first substrate 200. The spacer pillars 204 are disposed in a flat region 205 of the display panel to fix and support the first substrate 200 and the second substrate 201.

Wherein, the first support pillars 202 and the second support pillars 203 are disposed in the bending region of the display panel. The first support pillars 202 are disposed on the first substrate 200, and the support pillars 203 are disposed on the second substrate. Specifically, when the first support pillars 202 and the second support pillars 203 are disposed, the first support pillars 202 are spaced apart, which means a gap is disposed between the adjacent first support pillars 202. Correspondingly, the second support pillars 203 are also spaced apart, and the second support pillars 203 are disposed at positions corresponding to the gaps of the first support pillars 202. Thus, when the first substrate 200 is combined with the second substrate 201, the first support pillars 202 can be inserted into the gaps of the second support pillars 203. Moreover, the second support pillars 203 can exactly be inserted into the gaps between the first support pillars 202, and then the first support pillars 202 and the second support pillar s203 can form an interlocking structure.

After the panel is bent, in the bending region 206, the first support pillars 202 and the second support pillars 203 are fixedly locked to each other since the first support pillars 202 and the second support pillars 203 are disposed. Therefore, the first support pillars 202 and the second support pillars 203 can release a portion of the shear stress generated by the first substrate 200 and the second substrate 201 due to the bending. Thereby, the stress in the bending region 206 is reduced, to alleviate the problem of cracking in the panels.

Preferably, the first support pillars 202 and the second support pillars 203 may also be a structure of first protrusions and second protrusions. After the first substrate 200 and the second substrate 201 are combined, the interlocking structure of the embodiment of the present disclosure is formed between the first protrusions and the second protrusions, so as to reduce the stress in the bending region 206 and to alleviate the problem of cracking in the panels.

Specifically, a length of the first support pillars 202 and a length of the second support pillars 203 are shorter than a distance between the first substrate 200 and the second substrate 201. Therefore, when the display panel is bent, the support pillars do not cause damage to the first substrate 200 and the second substrate 201. Moreover, when the second support pillars are disposed, a cross-sectional area of an end of the second support pillars 203 away from the second substrate 201 is smaller than a cross-sectional area of an end of the second support pillars 203 connected to the second substrate 201. Therefore, the second support pillars are easily inserted into the gaps of the first support pillars 202, thereby improving the productivity.

In order to conserve materials, when the first support pillars are disposed, a height of the first support pillars is less than a height of the second support pillars 203. According to the specific product, the first support pillars 202 are designed to be fixed and prevented from being displaced when the second support pillars 202 are displaced.

After the upper substrate and the lower substrate undergoes the cell-forming process, a sealant 207 is disposed in the bending region 206 of the first substrate 200 opposite to the second substrate 201, and the upper substrate and the lower substrate are tightly engaged by the sealant 207. Moreover, the first support pillars 202 and the second support pillars 203 are sealed in the bending region 206 by the sealant 207, so as to further improve engagements of the support pillars. Moreover, the sealant 207 can also release a part of the bending stress, so as to effectively protect the display panel.

Figure 3A:
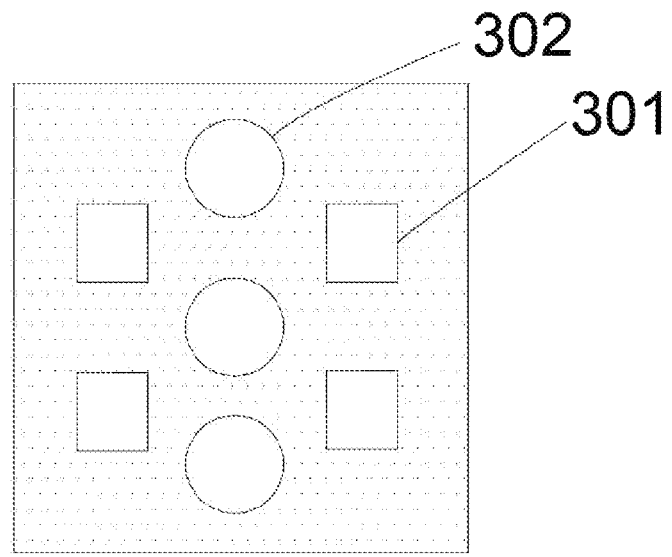
FIG. 3A is a schematic plan view of an arrangement structure of first protrusions and second protrusions according to an embodiment of the present disclosure.

Furthermore, refer to FIG. 3A, which is a schematic plan view of an arrangement structure of the first protrusions and the second protrusions according to an embodiment of the present disclosure. In order to firmly engage the first protrusions 301 and the second protrusions 302 in the engagement and release the shear stress generated in the bending region, the first protrusions 301 are arranged in a rectangular array when being disposed, and correspondingly, the second protrusions 302 are arranged as a linear structure. When the first protrusions 301 and the second protrusions 302 are being engaged with each other, each of the second protrusions arranged as the linear structure is inserted into a center of a rectangle of the rectangular array in which each of the first protrusions 301 is arranged. Thereby, the first protrusions 301 and the second protrusions 302 are firmly engaged. When the curved display panel is bent, the first protrusions 301 and the second protrusions 302 are not displaced, and the bending stress caused by the bending is effectively released, so as to effectively protect the display panel.

Furthermore, in order to improve a bonding force between the first protrusions 301 and the second protrusions 302 and effectively release the stress in the bending region, a cross-section of the first protrusion 301 may be configured to be a rectangular cross-section. That is, the first protrusions 301 are square column structures. A cross-section of the second protrusions 302 may be configured to be a circular cross-section. That is, the second protrusions 302 are cylindrical structures.

Figure 3B:
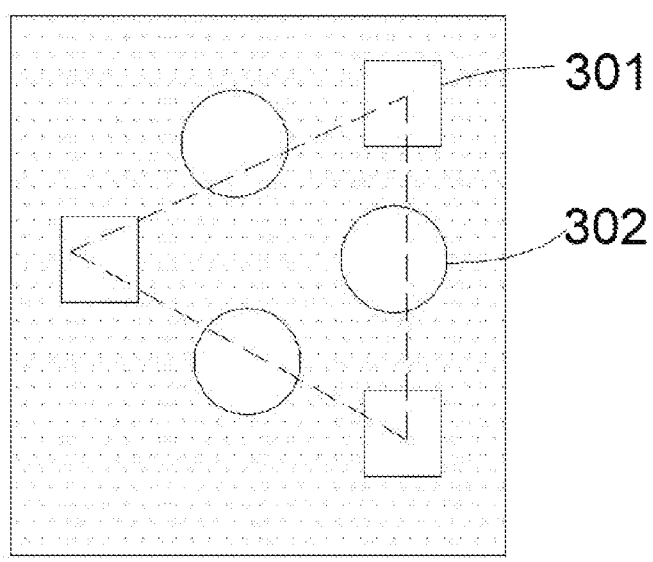
FIG. 3B is a schematic plan view of an arrangement structure of other first protrusions and second protrusions according to an embodiment of the present disclosure.

Preferably, refer to FIG. 3B, which is a schematic plan view of an arrangement structure of other first protrusions and second protrusions according to an embodiment of the present disclosure. The first protrusions 301 are arranged in a triangular array when being disposed, and correspondingly, the second protrusions 302 are also arranged in the triangular array. That is, when the second protrusions 302 are disposed, the second protrusions 302 are disposed in one-to-one correspondence to three sides of a triangle formed by each of the first protrusions. When the first protrusions 301 and the second protrusions 302 are being engaged with each other, each of the second protrusions 302 arranged in the triangular array is inserted into a gap of the triangular array in which each of the first protrusions 301 is arranged. After the bending region of the display panel is bent, the first protrusions 301 and the second protrusions 302 are displaced along with the bending of the upper substrate and the lower substrate. When the first protrusions 301 and the second protrusions 302 are displaced, the first protrusions 301 and the second protrusions 302 block each other. Moreover, in a blocking process, a part of the bending stress generated by the upper substrate and the lower substrate is released, so as to firmly engage the first protrusions 301 and the second protrusions 302 and protect the display panel.

Figure 4:
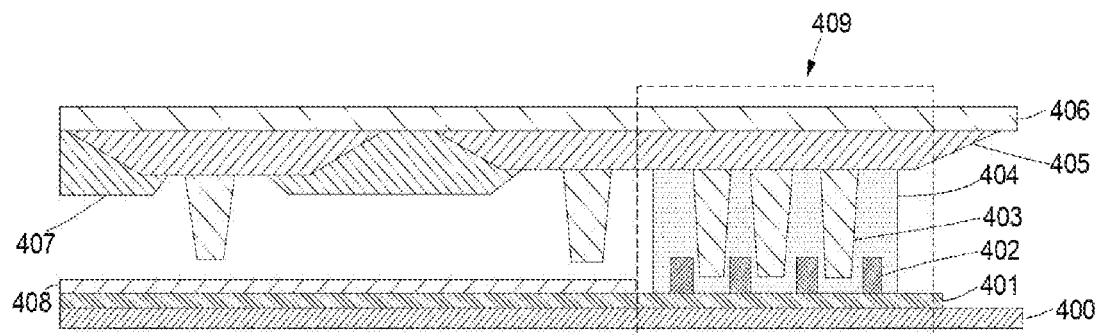
FIG. 4 is a schematic view of a structure of a display panel according to an embodiment of the present disclosure.

Refer to FIG. 4, which is a schematic view of a structure of a display panel according to an embodiment of the present disclosure. The display panel includes a base 400, an insulating layer 401, and an indium tin oxide film 408. The insulating layer 401 is disposed on the base 400, and the indium tin oxide film 408 is disposed on the insulating layer 401. The base 400, the insulating layer 401, and the indium tin oxide film 408 constitute a thin film transistor substrate of the display panel. The thin film transistor substrate further includes a metal layer and a polyimide film. The metal layer is disposed on a germanium polyimide film, and the base 400 is disposed on the metal layer.

Specifically, first protrusions 402, second protrusions 403, and a sealant 404 are further disposed in a bending region 409 of the display panel. In combination with the structures provided by the FIG. 2-3B of the present disclosure, the first protrusions 402 are disposed opposite to the second protrusions 403, and a density of the first protrusions 402 in the bending region 409 is greater than a density of the first protrusions in other regions. The first protrusions 402 and the second protrusions 403 can be mutually inserted into corresponding gaps, to achieve an effectively fixing and interlocking function.

The display panel further includes black arrays 405, color resists 407, and a color filter substrate 406, wherein the black arrays 405 and the color resists 407 are disposed on a surface of a side of the color filter substrate 406 opposite to the base 400, and the color resists 407 are disposed in a fixed region formed by the black arrays 405. The color resists 407 include a red color resist, green color resist, and blue color resist. When the second protrusions 403 are disposed, the second protrusions 403 may be disposed in intervals of the color resists 407 to prevent the light of the color resists 407 from being blocked.

In the embodiment of the present disclosure, under the premise of not increasing a width of the sealant and reducing a ratio of screen to body, the first protrusions 402 and the second protrusions 403 are disposed on a sealant coating region at edges of the upper substrate and the lower substrate. When the display panel is bent in the bending region, the first protrusions 402 and the second protrusions 403 of the interlocking structure can effectively reduce the risk of tearing of the upper substrate and the lower substrate of the curved panel, and improve yield and reliability of the curved display.

Figure 5:
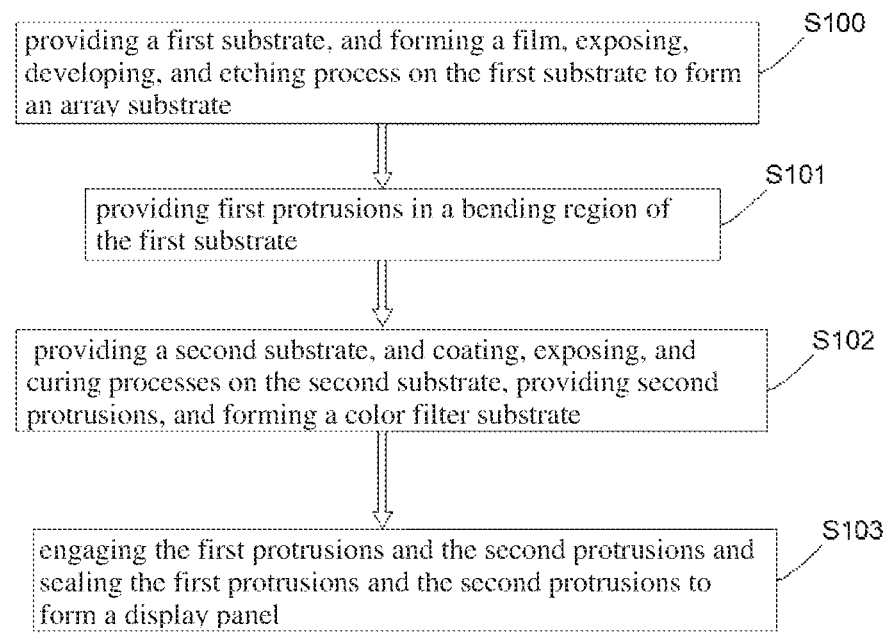
FIG. 5 is a schematic view of a manufacturing process of the display panel according to an embodiment of the present disclosure.

Refer to FIG. 5, which is a schematic view of a manufacturing process of the display panel according to an embodiment of the present disclosure. The schematic view of the manufacturing process of the display panel according to the embodiment of the present disclosure includes steps as below:

Step S100 relates to providing a first substrate, and forming a film, exposing, developing, and etching process on the first substrate to form an array substrate.

Each film on a thin film transistor substrate is formed by film-forming processes, such as exposure, development, and etching, on a base substrate, and is prepared for the subsequent production process.

Step S101 relates to providing first protrusions in a bending region of the first substrate.

After the preparation of each film on the array substrate, the first protrusions are disposed on a sealant coating region in an edge curved region of the array substrate. The first protrusions may be prepared by forming processes of exposure, development and ashing of an organic film.

Step S102 relates to providing a second substrate, and performing coating, exposing, and curing processes on the second substrate, and forming a color filter substrate.

After the preparation of the lower substrate is completed, the upper substrate of the display panel is prepared in the step S102. A black array layer, a color resist layer, a protective film, support pillars and the likes in a module are respectively prepared by photolithography processes, such as, coating, exposure and curing on the second substrate. Moreover, spacer pillar structures are disposed in the sealant coating region at the edge of the second substrate.

Step S103 relates to engaging the first protrusions and the second protrusions and sealing the first protrusions and the second protrusions to form a display panel.

According to a mutual cooperation relationship between the first protrusions and the second protrusions, the upper substrate and the lower substrate are engaged with each other after the first protrusions and the second protrusions are disposed. In the engaging process, the first protrusions and the second protrusions are mutually inserted into the gaps of the opposite protrusions, an interlocking between the first protrusions and the second protrusions is completed, and the first protrusions and the second protrusions are sealed with a sealant to form a complete curved display panel.

The display panel and the manufacturing method thereof provided by the embodiments of the present disclosure are described in detail as above. The description of the embodiments is only for helping understand the technical solutions and its core idea of present disclosure. It should be understood by those skilled in the art that they can still modify the technical solutions described in the above embodiments or equivalently replace some of the technical features, and these modifications or replacements do not depart from the scope of the technical solutions of the embodiments of the present disclosure.

What is claimed is:

1. A display panel, comprising:
    a first substrate;
    a second substrate, wherein the first substrate is disposed opposite to the second substrate;
    the first substrate and the second substrate further comprise a flat region and a bending region disposed adjacent to the flat region;
    wherein the first substrate is provided with first protrusions and the second substrate is provided with second protrusions on an area corresponding to the bending region, a gap is disposed between adjacent ones of the first protrusions and adjacent ones of the second protrusions, the first protrusions and the second protrusions are inserted in an alternative manner into the gap;
    wherein a length of the first protrusions and a length of the second protrusions are shorter than a distance between the first substrate and the second substrate, and the first substrate comprises a thin film transistor substrate;
    wherein an arrangement shape of the first protrusions comprises a triangular array, and an arrangement shape of the second protrusions comprises a triangular arrangement, and the second protrusions are disposed in one-to-one correspondence to three sides of a triangle formed by each of the first protrusions.

2. The display panel as claimed in claim 1, wherein a cross-sectional area of the second protrusions away from an end of the second substrate is smaller than a cross-sectional area of an end of the second protrusions connected to the second substrate.

3. The display panel as claimed in claim 1, further comprising a sealant, which is coated on the bending region, and seals the first protrusions and the second protrusions.

4. The display panel as claimed in claim 1, wherein the second protrusions comprise support pillars disposed in the flat region and the bending region.

5. The display panel as claimed in claim 1, wherein the second substrate comprises a color filter substrate.

6. The display panel as claimed in claim 1, further comprising a black array layer and a color resist layer, the black array layer and the color resist layer disposed on a side of the second substrate opposite to the first substrate.

7. A display panel, comprising:
    a first substrate;
    a second substrate, wherein the first substrate is disposed opposite to the second substrate;
    the first substrate and the second substrate further comprise a flat region and a bending region disposed adjacent to the flat region;
    wherein the first substrate is provided with first protrusions and the second substrate is provided with second protrusions on an area corresponding to the bending region, a gap is disposed between adjacent ones of the first protrusions and adjacent ones of the second protrusions, the first protrusions and the second protrusions are inserted in an alternative manner into the gap;
    wherein an arrangement shape of the first protrusions comprises a triangular array, and an arrangement shape of the second protrusions comprises a triangular arrangement, and the second protrusions are disposed in one-to-one correspondence to three sides of a triangle formed by each of the first protrusions.

8. The display panel as claimed in claim 7, wherein a cross-sectional area of the second protrusions away from an end of the second substrate is smaller than a cross-sectional area of an end of the second protrusions connected to the second substrate.

9. The display panel as claimed in claim 7, further comprising a sealant, which is coated on the bending region, and seals the first protrusions and the second protrusions.

10. The display panel as claimed in claim 7, wherein the second protrusions comprise support pillars disposed in the flat region and the bending region.

11. The display panel as claimed in claim 7, wherein the first substrate comprises a thin film transistor substrate, the second substrate comprises a color filter substrate.

12. The display panel as claimed in claim 7, further comprising a black array layer and a color resist layer, the black array layer and the color resist layer disposed on a side of the second substrate opposite to the first substrate.

13. A manufacturing method for a display panel, comprising steps as below: S100: providing a first substrate, and forming a film, and performing exposing, developing, and etching processes on the first substrate to form an array substrate; S101: providing first protrusions in a bending region of the first substrate; S102: providing a second substrate, and performing coating, exposing, and curing processes on the second substrate, providing second protrusions, and forming a color filter substrate; S103: engaging the first protrusions and the second protrusions and sealing the first protrusions and the second protrusions to form a display panel, wherein an arrangement shape of the first protrusions comprises a triangular array, and an arrangement shape of the second protrusions comprises a triangular arrangement, and the second protrusions are disposed in one-to-one correspondence to three sides of a triangle formed by each of the first protrusions.

* * * * *